United States Patent [19]

Kiyomitsu et al.

[11] 4,159,147
[45] Jun. 26, 1979

[54] LATCH RELEASING MECHANISM FOR USE IN A FRONT SEAT OF A VEHICLE

[75] Inventors: Isao Kiyomitsu; Hiroyuki Gokimoto; Yutaka Sakamoto, all of Hiroshima, Japan

[73] Assignees: Toyo Kogyo Co., Ltd.; Delta Kogyo Co., Ltd., both of Hiroshima, Japan

[21] Appl. No.: 872,585

[22] Filed: Jan. 26, 1978

[30] Foreign Application Priority Data

Jan. 26, 1977 [JP] Japan .................. 52/8667[U]
Jul. 5, 1977 [JP] Japan .................. 52/89579[U]

[51] Int. Cl.² ............................................. B60N 1/04
[52] U.S. Cl. .................................................. 297/341
[58] Field of Search ......................................... 297/341

[56] References Cited

U.S. PATENT DOCUMENTS

| 3,931,995 | 1/1976 | Arai ...................... 297/341 |
| 3,940,182 | 2/1976 | Tamura ................... 297/341 |
| 3,981,473 | 9/1976 | Nagai .................... 297/341 |

*Primary Examiner*—Francis K. Zugel
*Attorney, Agent, or Firm*—Wenderoth, Lind & Ponack

[57] ABSTRACT

A front seat includes a seat cushion and a reclining back cushion, and is so arranged as to move back and forth between forward and retracted positions. The seat is temporarily released from the latched position for moving the seat towards the most forward position for facilitating movement of the rear seat passengers into and out of the vehicle. Thereafter, the front seat is again returned and latched in an original position by the operation of latch releasing mechanism employed in the front seat.

7 Claims, 13 Drawing Figures

LATCH RELEASING MECHANISM FOR USE IN A FRONT SEAT OF A VEHICLE

The present invention relates to a front seat of a two door vehicle, and more particularly, to a latch releasing mechanism for temporarily releasing the front seat from a latched position to move the front seat towards the most forward position and to tilt a reclining back cushion towards the front for facilitating movement of the rear seat passengers of into and out from the vehicle.

Usually, the two door vehicle has a shiftable front seat which is so arranged as to move back and forth between forward and retracted positions by a movement of a carrier member supporting the seat slidably on a rail member fixedly provided on the body of the vehicle. The seat includes a seat cushion and a reclining back cushion pivotally connected to the seat cushion for tilting the back cushion towards and away from the seat cushion. The carrier member is coupled with a latch means for maintaining the seat in a required position between the forward and retracted positions. The latch releasing mechanism is normally combined with the latch means for temporarily releasing the latch means to move the front seat towards the most forward position thereof for enabling the rear seat passengers to move into and out of the vehicle. Thereafter, the front seat is again returned to the original position.

One conventional latch releasing mechanism is disclosed in U.S. Pat. No. 3,931,995 of Tomiji Arai, in which the various components constituting the latch releasing mechanism are disposed on the carrier member in a spaced relation to each other, so that the latch releasing mechanism occupies a large space on the carrier member. Furthermore, since the components thereof are provided independently on the carrier member by different mounting means, such as different shafts, a large number of manufacturing steps are necessary for constructing the latch releasing mechanism, while at the same time, the manufacturing cost therefor are accordingly increased.

Accordingly, a primary object of the present invention is to provide a latch releasing mechanism which has a simple construction, and which is easy to operate for efficient shifting of the front seat including the seat cushion and the reclining cushion.

Another important object of the present invention is to provide a latch releasing mechanism of the above described type which is compact in size, and can be readily incorporated into seats of the reclining type at low cost.

In order to accomplish these and other objects, the latch releasing mechanism of the present invention comprises a latch release blade pivotally mounted on the carrier member for movement towards and away from a predetermined position at which the latch release blade releases the latch mechanism. The latch release blade is moved to said predetermined position upon movement of the back cushion when the back cushion is tilted. The latch release blade further has a detent recess therein.

A manually operable lever, pivotally mounted on the carrier member, has a trigger arm engagable with the latch release blade for movement of the latch release blade towards the predetermined position upon movement of the manually operable lever in a predetermined direction.

A lock member pivotally mounted on the manually operable lever, has an engaging portion which is engagable with the detent recess when the latch release blade is moved to the predetermined position.

The latch releasing mechanism of the present invention further comprises means for biasing the lock member in a predetermined direction to lock the latch release blade in the predetermined position when the latch release blade is moved to the predetermined position, and detent release means provided on the rail for moving the lock member in an opposite direction to the predetermined direction to unlock the latch release blade when the lock member is moved by the detent release means as a result of movement of the carrier member towards the retracted position.

These and other objects and features of the present invention will become apparent from the following description taken in conjunction with preferred embodiments thereof with reference to the accompanying drawings, in which.

Figure 2:
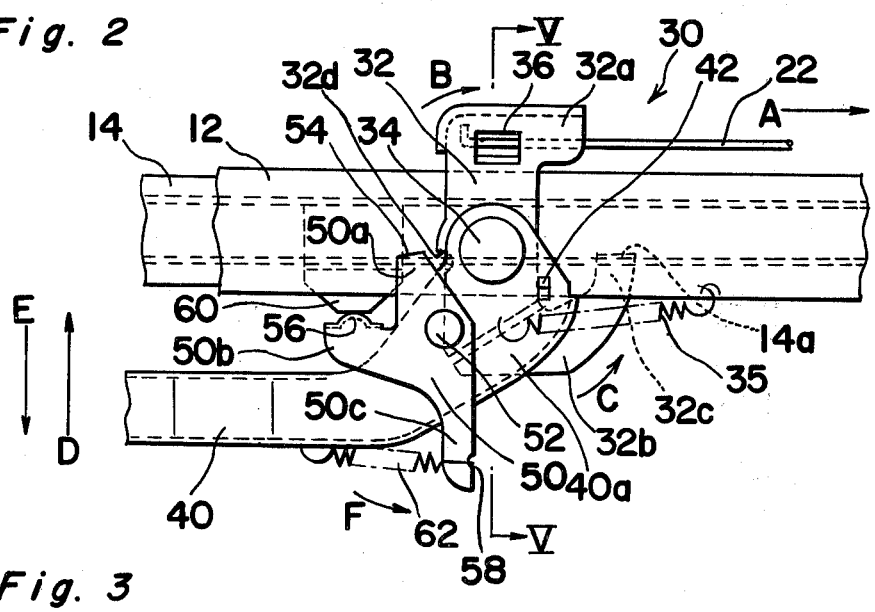
FIG. 2 is a fragmentary top plan view of the latch releasing mechanism of the present invention.
Figure 6:
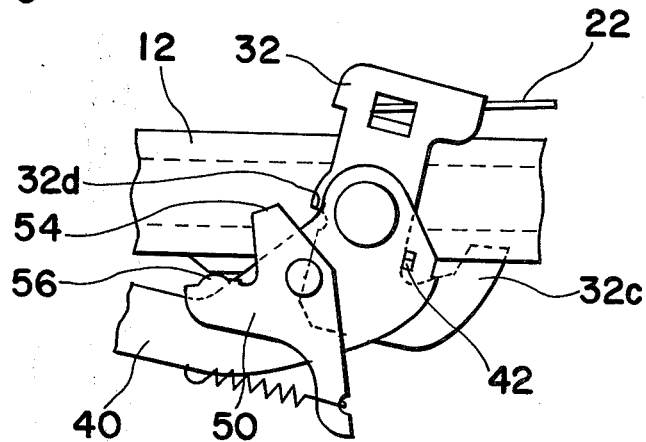
Figure 7:
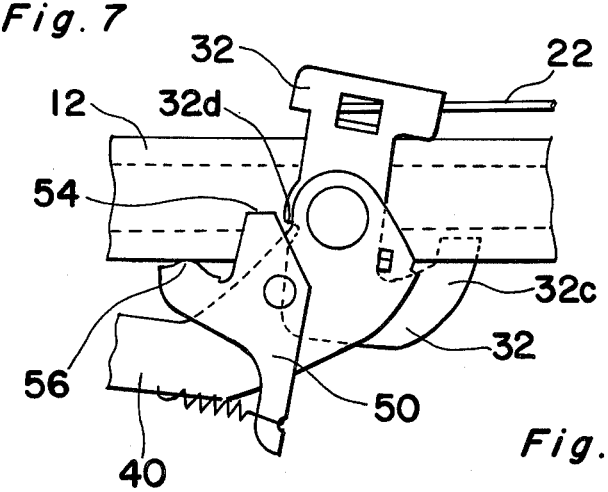
Figure 8:
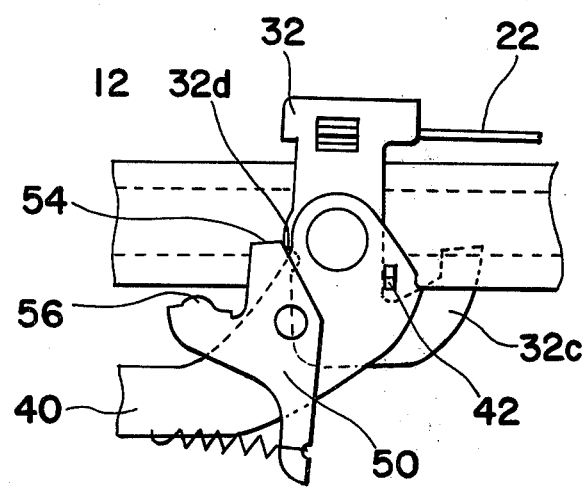
Figure 9:
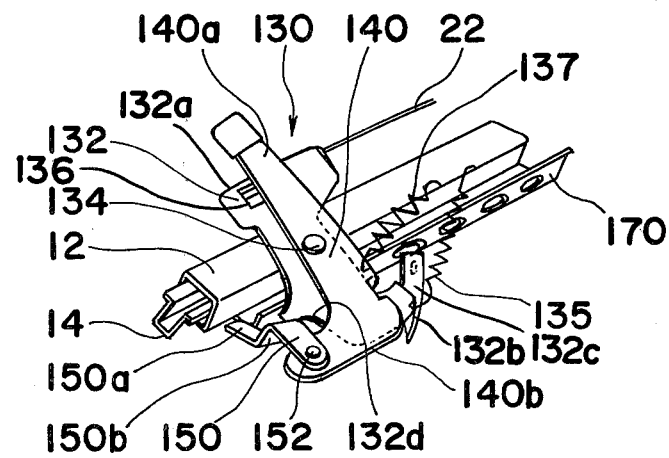
Figure 10:
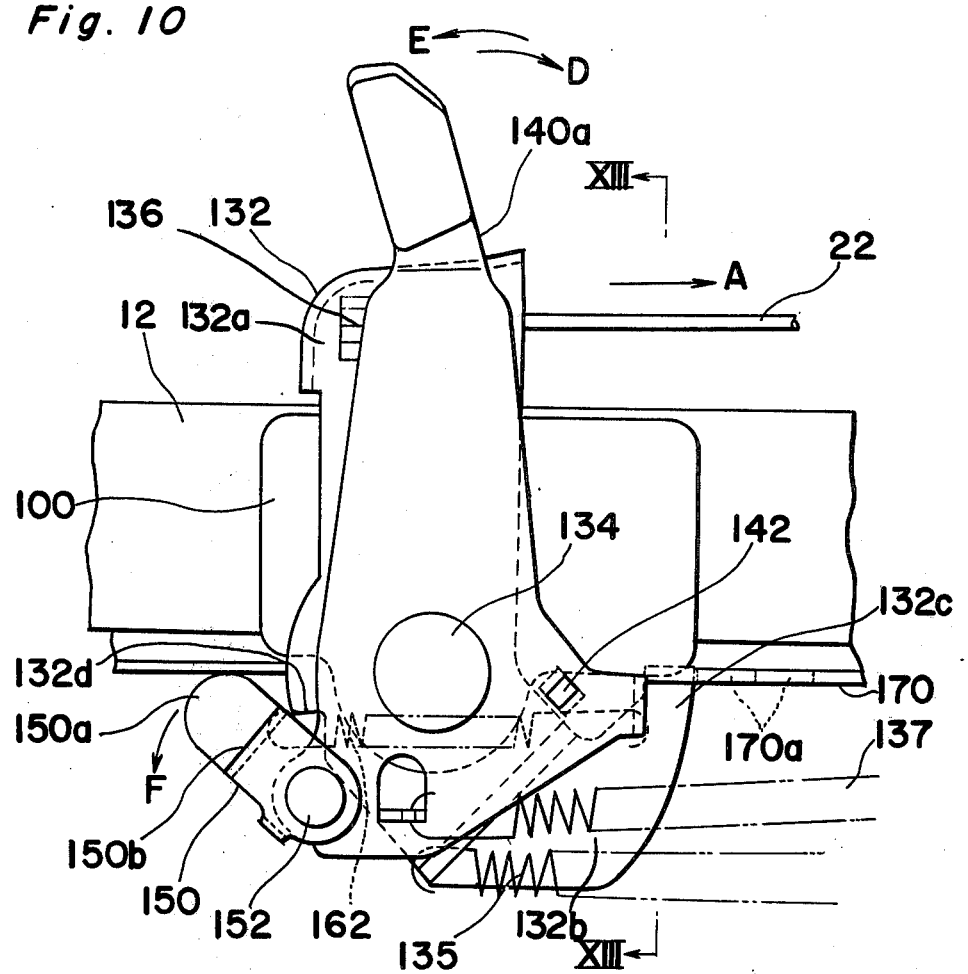
Figure 11:
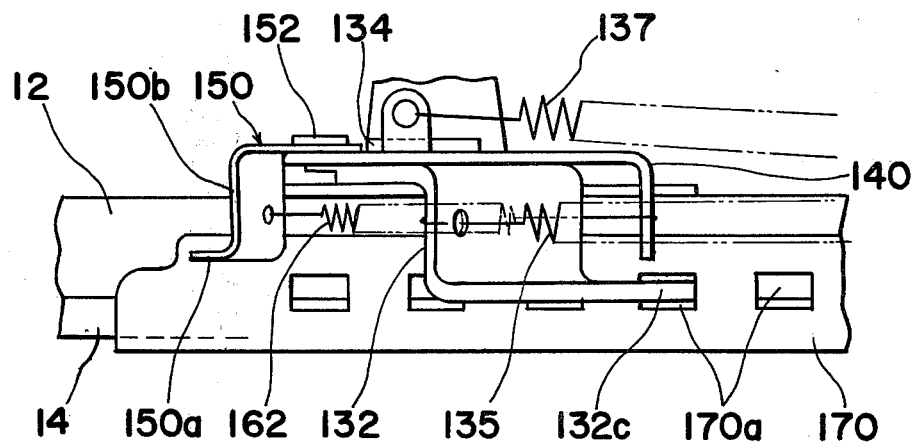
Figure 12:
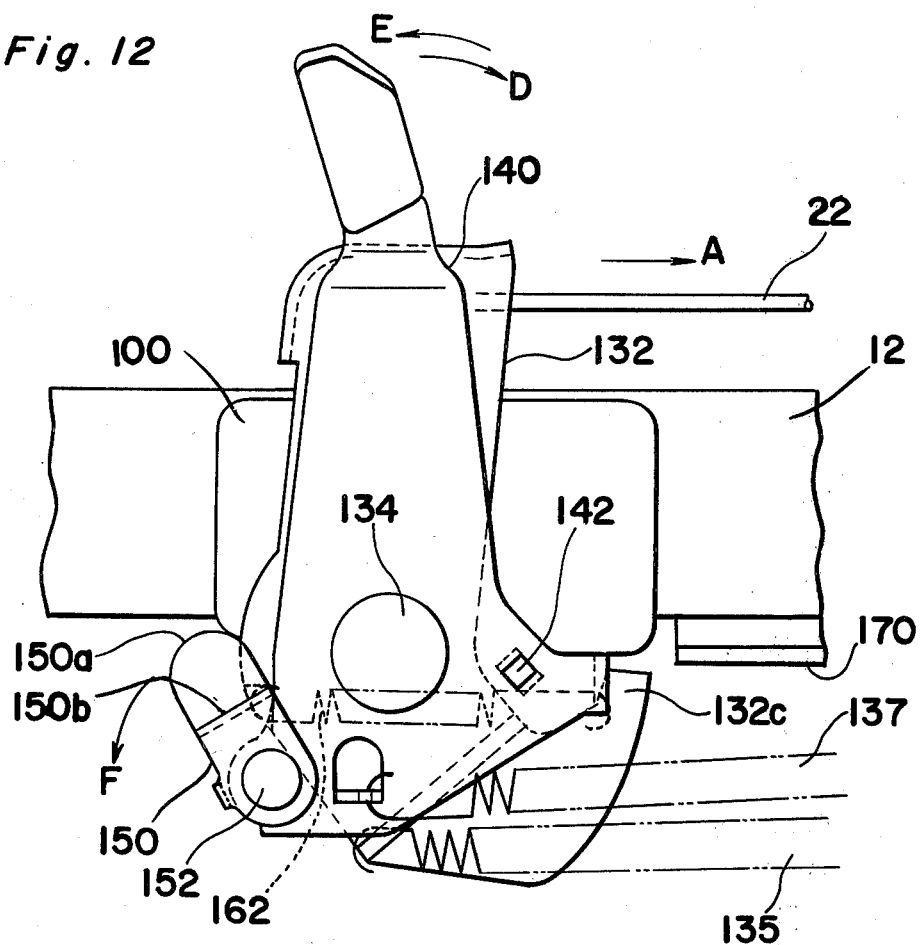
Figure 13:
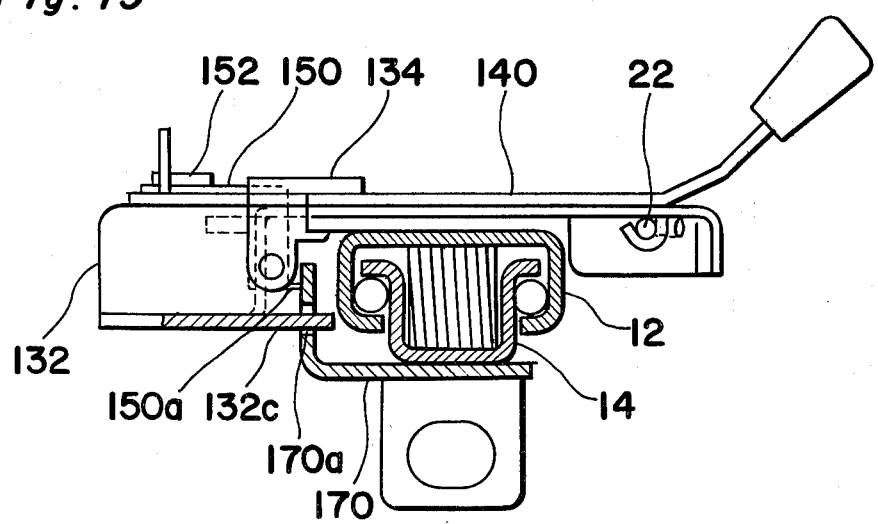

FIGS. 6, 7, and 8 are schematic views of the latch releasing mechanism shown in FIG. 2, each showing a different condition thereof;

FIG. 9 is a perspective view of the latch releasing mechanism according to another embodiment;

FIG. 10 is a fragmentary top plan view of the latch releasing mechanism the embodiment of FIG. 9;

FIG. 11 is a fragmentary side view of the latch releasing mechanism shown in FIG. 10;

FIG. 12 is view similar to FIG. 10, but particularly showing a different condition thereof; and FIG. 13 is a cross-sectional view taken along line XIII—XIII shown in FIG. 10.

Before the description of the present invention proceeds, it is to be noted that like parts are designated by like reference numerals throughout the accompanying drawings.

Figure 1:
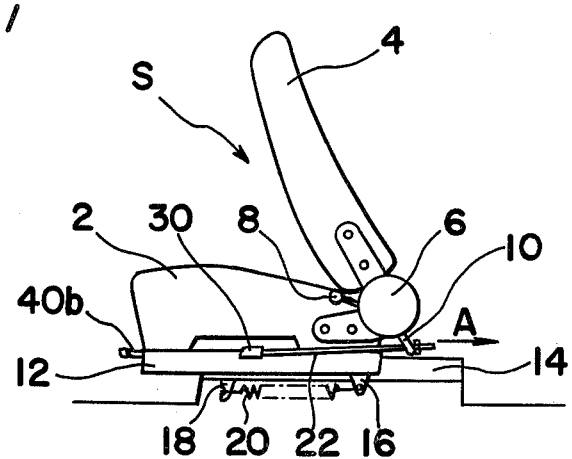
FIG. 1 is a side elevational view of a seat having a latch releasing mechanism according to the present invention.

Referring to FIG. 1, a front seat S employed in a vehicle, especially of the two door type, includes a seat cushion 2 on which the driver or the passenger sits and a reclining back cushion 4 pivotally connected to the seat cushion 2 through a reclining mechanism 6 of a known type which is provided for adjusting the angle of the back cushion 4 with respect to the seat cushion 2 and also for tilting the back cushion 4 towards the seat cushion 2. The reclining mechanism 6 includes a knob 8 which is manually moved in one direction for freeing the back cushion 4 for rotation about the reclining mechanism 6 to a desired angle with respect to the seat cushion 2, and is moved in opposite direction to said one direction for firmly fixing the back cushion 4 at the desired angle.

The seat cushion 2 is firmly connected to a carrier member 12 which is slidably mounted on a rail 14 firmly connected to the body of the vehicle. A projection 16 is provided at one end portion, namely the rear end portion, of the carrier member 12 while a projection 18 is provided at one end portion, namely the front end portion, of the rail 14. A spring 20 is biased between the projections 16 and 18 for urging the carrier member 12 in the left-hand direction, namely the front direction with respect to the vehicle.

The carrier member 12 and rail 14 are preferably provided in two or more pairs, for example, two pairs which are provided in parallel relation to each other for slidably moving the seat S back and forth between forward and retracted positions. FIG. 1 shows only one carrier member 12 and rail 14, which are provided with a latch releasing mechanism 30 of the present invention described later.

A projection 10 projecting from the reclining mechanism 6 at approximately opposite side to the side where the back cushion 4 is provided rotates about the reclining mechanism 6 in relation to the rotation of the back cushion 4 about the reclining mechanism 6. A connecting rod 22 has one end portion connected to the projection 10, while the other end is hooked to the latch releasing mechanism 30 for transmitting to the latch releasing mechanism 30, the movement of the projection 10, and more particularly, the movement of the projection 10 in the direction indicated by an arrow A. In other words, the connecting rod 22 is shifted in the direction A upon tilting the back cushion 4 towards the front, while the returning of the back cushion 4 to the original position will not cause transmission of any movement to the latch releasing mechanism 30, but merely loosen the hooked condition between the rod 22 and the latch releasing mechanism 30.

Figure 3:
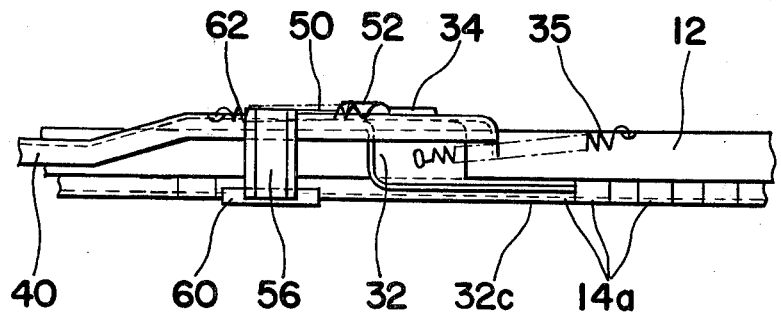
FIG. 3 is a fragmentary side view of the latch releasing mechanism shown in FIG. 2.
Figure 5:
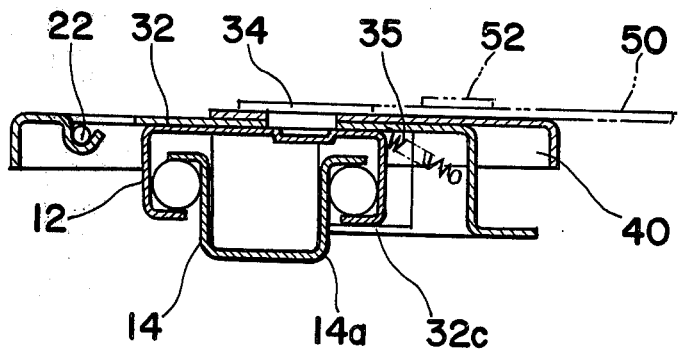
FIG. 5 is a cross-sectional view taken along the line V—V shown in FIG. 2.

Referring to FIGS. 2 and 3, the latch releasing mechanism 30 of the present invention comprises a blade member 32 pivotally mounted at an intermediate portion thereof, by a shaft 34, on the top of the carrier member 12 for movement between an engaged position and a disengaged position. The blade member 32 has on one end portion 32a a projecting edge 36 capable of being hooked to the other end of the rod 22 while the other end portion 32b has a curved arm 32c. It is to be noted that the curved arm 32c extends below the top plane of the carrier member 12, as best shown in FIG. 5, so that the end portion of the curved arm 32c will come into contact with the rail 14. The rail 14, along the side face thereof, is provided with number of openings 14a for receiving therein the end portion of the curved arm 32c.

A spring 35 is connected between the carrier member 12 and the blade member 32 for urging the blade member 32 to rotate a counterclockwise direction, so as to position and maintain the blade member 32 in the engaged position where the curved arm 32c is inserted into one of the openings 14a. When the blade member 32 is turned to the engaged position, the carrier member 12 is latched in a position with respect to the rail 14, and thus the seat S is locked in a position with respect to the rail 14. The disengagement of the curved arm 32c from the opening 14a turns the blade member 32 to the disengaged position. When the blade member 32 is in the disengaged position, the carrier member 12 is unlatched from the rail 14, and thus, the seat S is in a condition capable of sliding along the rail 14 between the forward and retracted positions. The disengaged position of the blade member 32 can be effected by the movement of the rod 22 in the direction A as a result of tilting of the back cushion 4 towards the seat cushion 2, as shown in FIG. 1, or otherwise, by the movement of a manually operable lever 40 described hereinbelow.

The lever 40, positioned on top of the blade member 32, is pivotally mounted at one end portion 40a thereof, by the shaft 34, on the carrier member 12. The other end portion 40b of the lever 40 extends along the carrier member 12 and terminates in front of the seat S (FIG. 1) for manual operation of the lever 40. The lever 40, at the end portion 40a, is provided with a trigger projection 42 extending in parallel relation to the shaft 34 towards the carrier member 12. It is to be noted that the lever 40 is normally biased by a suitable spring means such as a coil spring (not shown) for urging the lever 40 to rotate in a direction indicated by an arrow E and to terminate in the position shown in FIG. 2 by an engagement of the lever 40 and the member 12.

Upon manual rotation of the lever 40 about the shaft 34 in the direction indicated by the arrow D, the trigger projection 42 comes into contact with the right-hand side edge of the blade member 32, and a further rotation of the lever 40 in the direction D rotates the blade member 32 in a clockwise direction against the biasing force of the spring 34, so that the blade member 32 is turned to the disengaged position.

A lock member 50, positioned on top of the lever 40, is pivotally mounted at approximately the central portion thereof, by a shaft 52, on the end portion 40a of the lever 40. The lock member 50 has three arms 50a, 50b and 50c extending from the center thereof. The first arm 50a has an engaging edge 54 extending parallel to the shaft 52 towards the carrier member 12 for engagement with the blade member 32. The second arm 50b extending approximately at right angles to the first arm 50a is formed with a contact surface 56 extending in parallel to the shaft 52 towards the rail 14 for the sliding contact with a projection 60 which is fixedly provided on the side of the rail 14, while the third arm 50c extending in approximately the opposite direction to the first arm 50a has a recess 58 for connecting thereto one end of a spring 62. The other end of the spring 62 is connected with the lever 40 for urging the entire lock member 50 in a clockwise direction.

The engagement and disengagement between the engaging edge 54 and the blade member 32 is carried out in a manner described hereinbelow. The blade member 32 has a detent recess 32d in the left-hand side edge thereof adjacent the shaft 34. When the blade member 32 is in the engaged position, as shown in FIG. 2, where the curved arm 32c is inserted into an opening 14a, the engaging edge 54 on the lock member 50 is located adjacent the detent recess 32d, as shown in FIG. 2, the engaging edge 54 being in an unlocked position with respect to the detent recess 32d.

Figure 4:
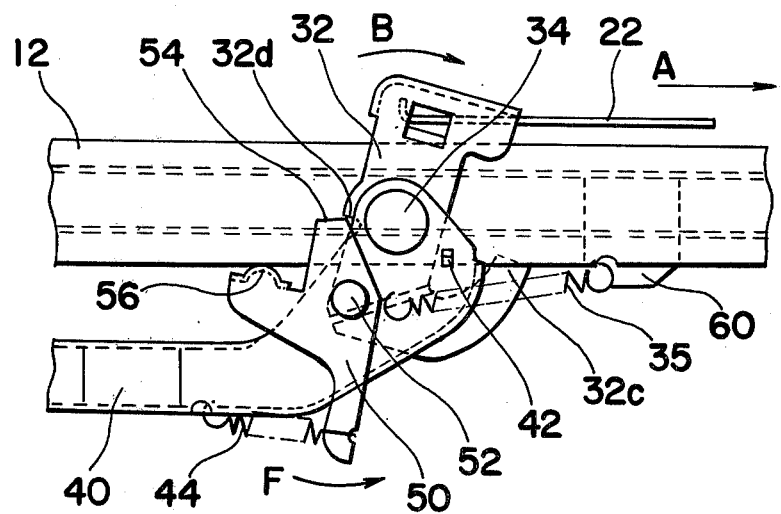
FIG. 4 is a view similar to FIG. 2, but particularly showing a different condition thereof.

On the other hand, when the blade member 32 is turned to the disengaged position, as shown in FIG. 4, as a result of tilting of the back cushion 4 towards the seat cushion 2, the blade member 32 rotates so that the engaging edge 54 of the lock member 50 comes into contact with the detent recess 32d, and thus, the engaging edge 54 is in a locked position with respect to the detent recess 32d. However, when the blade member 32 is turned to the disengaged position, as shown in FIGS. 6 and 7, as a result of manual rotation of the lever 40 in the direction D, the contact of the edge 54 and the recess 32d is released.

The description hereinbelow is directed to the movement of the latch releasing mechanism 30 of the present invention in relation to the movement of the seat S for accommodating passenger in a rear seat (not shown) of the vehicle.

First, the knob 8 is manually in one direction to permit tilting of the back cushion 4 towards the seat cushion 2, as shown in FIG. 1. Thereupon, the rod 22 is simultaneously shifted in the direction A to rotate the blade member 32 in a clockwise direction. Thus, the blade member 32 is turned from the engaged position (FIG. 2) to the disengaged position and the biasing force of the spring 20 moves the seat S in the forward direction. Accordingly, the surface 56 moves out of engagement with the projection 60, and the lock member 50 rotates in the clockwise direction due to the biasing force of the spring 62. As result, the edge 54 moves into the recess 32d, and the blade member 32 is maintained at the disengaged position, and the seat S is moved to the most forward position (FIG. 4). In this condition, the passenger may simply move into the rear seat of the vehicle through a wide open space formed behind the front seat S which has been moved to the most forward position. Thereafter, the back cushion 4 is rotated about the reclining mechanism 6 in a clockwise direction to return to the original position. It is to be noted that the returning of the back cushion 4 will not cause any movement of the latch releasing mechanism 30, so that the blade member 32 is still maintained in the disengaged position. Therefore, the seat S can be slidingly moved along the rail 14 towards the retracted position. After the seat S is moved towards the retracted position a predetermined distance, the contact surface 56 comes into contact with the projection 60 projecting from the rail 14 at an intermediate portion thereof, so that the lock member 50 is rotated in a counterclockwise direction towards the unlocked position, thus, allowing the blade member 32 to turn to the engaged position, as shown in FIG. 2.

Then, the passenger in the front seat S may adjust the position of the seat by turning the end portion 40b of the lever 40 in the direction D, as shown in FIGS. 6 and 7, for turning the blade member 32 towards the disengaged position. Thereupon, the passenger moves the seat S to the position where he desires, and then, returns the end portion 40b of the lever 40 in the original position to return the blade member 32 to the locked position, as shown in FIG. 8.

Referring to FIGS. 9 to 13, there is shown a latch releasing mechanism 130 which is another embodiment of the latch releasing mechanism 30 described above. The latch releasing mechanism 130 comprises a blade member 132 of a similar type as described above pivotally mounted at an intermediate portion thereof, by a shaft 134, on top of the carrier member 12 for movement between an engaged position and a disengaged position. The blade member 132 has on one end portion 132a a projecting edge 136 capable of being hooked with the other end of the rod 22, while the other end portion 132b has a curved arm 132c. Instead of having the curved arm 132c come into direct contact with the rail 14, as described above, the curved arm 132c comes into contact with an "L" shaped cross sectional bar 170 which is fixedly provided on the rail 14 in parallel relation thereto. One end of the bar 170 terminates at an intermediate position between the opposite ends of the rail 14 and the other end thereof terminates at approximately the rear end of the rail 14. The side surface of the bar 170 which is contacted by the curved arm 132c has a plurality of openings 170a in alignment with the rail 14 for receiving therein the end portion of the curved arm 132c. Since the rail 14 in this embodiment is not directly engaged by the curved arm 132c, because it is not necessary to form the openings in the rail 14 for the engagement by the curved arm 132c, it will be understood that the strength of the rail 14 for supporting the carrier member 12, as well as the seat S, is further increased. Furthermore, the presence of the bar member 170 reinforces the rail 14.

A spring 135 extends between the carrier member 12 and the blade member 132 for urging the blade member 132 to rotate in a counterclockwise direction, so as to position and maintain the blade member 132 in the engaged position where the curved arm 132c is inserted into one of the openings 170a. The disengagement of the curved arm 132c from the opening 170a turns the blade member 132 to the disengaged position. The disengaged position of the blade member 132 can be effected by the movement of the rod 22 in the direction A as a result of tilting of the back cushion 4 towards the seat cushion 2, in the same manner as described above, or otherwise, by the movement of a manually operable lever 140 described hereinbelow.

The lever 140, positioned on top of the blade member 132, is pivotally mounted at approximately the central portion thereof, by the shaft 134, on the carrier member 12. One end portion 140a of the lever 140 extends in a direction approximately perpendicular to the carrier member 12 terminates at the side of the seat S for manual operation of the lever 140. The other end portion 140b, is provided with a trigger projection 142 extending in parallel relation to the shaft 134 towards the carrier member 12. It is to be noted that the lever 140 is normally biased by a spring 137 extending between the lever 140 and the carrier member 12 for urging the lever 140 to rotate in a direction indicated by the arrow E and to terminate in a position shown in FIGS. 10 and 13 by the engagement of the lever 140 and the frame member 100.

Upon manual rotation of the lever 140 about the shaft 134 in a direction indicated by the arrow D, the trigger projection 142 comes into contact with the right-hand side edge of the blade member 132, and a further rotation of the lever 140 in the direction D rotates the blade member 132 in a clockwise direction against the biasing force of the springs 135 and 137, so that the blade member 132 is turned to the disengaged position.

The lock member 150 is pivotally mounted at approximately the end portion thereof, by a shaft 152, on the end portion 140b of the lever 140. The lock member 150 has an arm 150a extending in a horizontal plane below the top plane of the carrier member 12 and which is on a perpendicularly extending engaging portion 150b (FIG. 11). The length of the arm 150a is sufficient to cause it to come into contact with the side surface of the bar 170, while the engaging surface 150b is provided for the engagement with the blade member 132. A spring 162 is connected between the lock member 150 and the lever 140 for urging the lock member 150 to rotate in a clockwise direction.

The engagement and disengagement between the engaging surface 150b and the blade member 132 is carried out in such a manner described hereinbelow. The blade member 132 has a detent recess 132d in the left-hand side edge thereof adjacent the shaft 134. When the blade member 132 is in the engaged position, as shown in FIG. 10, where the curved arm 132c is inserted into opening 170a, the engaging surface 150b is positioned adjacent the detent recess 132d, that is, at the side of the detent recess 132d when viewed in FIG. 10, because of the rotation of the lock member 150 in the direction indicated by the arrow F caused by the contact between the arm 150a and the side surface of the bar 170. Accordingly, the engaging surface 150b is in an unlocked position with respect to the detent recess 132d.

On the other hand, when the blade member 132 is turned to the disengaged position, as shown in FIG. 12, as a result of tilting of the back cushion 4 towards the seat cushion 2, and furthermore, as a result of movement of the seat S to the forward position past the forward end of the bar 170, the lock member 150 is rotated by spring 162 in a direction opposite to the direction F, so that the engaging surface 150b moves into the detent recess 132c, and thus, the engaging surface 150b is in a locked position with respect to the detent recess 132d.

The description hereinbelow is directed to the movement of the latch releasing mechanism 130 of the present invention in relation to the movement of the seat S for accommodating a passenger in the rear seat (not shown) of the vehicle.

First, the knob 8 is manually moved in one direction to tilt the back cushion 4 towards the seat cushion 2, in the same manner as described before. Thereupon, the rod 22 is simultaneously shifted in the direction A to rotate the blade member 132 in a clockwise direction. Thus, the blade member 132 is turned to the disengaged position and is maintained at the disengaged position by the rod 22 continually holding the blade member 132 in the disengaged position. Accordingly, the biasing force of the spring 20 moves the seat S towards the most forward position. In the meantime, when the lock member 150 moves past the forward end of the bar 170, the lock member 150 rotates in a direction opposite to the direction F to the locked position where the engaging surface 150b engages in the detent recess 132d. During this condition, the passenger may simply move into the rear seat of the vehicle through a wide open space formed behind the front seat S which has been moved to the most forward position. Thereafter, the back cushion 4 is rotated about the reclining mechanism 6 in a clockwise direction to return to the original position. It is to be noted that the returning of the back cushion 4 will not effect any movement of the latch releasing mechanism 130 since the blade member 132 is maintained in the disengaged position by the lock member 150 which is in the locked position. Therefore, the seat S can be slidingly moved along the rail 14 towards the retracted position. After the seat S is moved towards the retracted position a predetermined distance, the arm 150a comes into contact with the edge of the bar 170 so that the lock member 150 is rotated in the direction F towards the unlocked position, thus, allowing the blade member 132 to turn to the engaged posotion.

Then, the passenger in the front seat S may adjust the position of the seat by turning the end portion 140a of the lever 140 in the direction D for turning the blade member 132 towards the disengaged position. Thereupon, the passenger moves the seat S to the position which he desires, and then, returns the end portion 140a of the lever 140 to the original position to turn the blade member 132 to the locked postion, as shown in FIG. 10.

It is to be noted that the latch releasing mechanism 30 or 130 of the present invention may be provided with a frame member or substrate such as shown in FIG. 10 designated by a reference number 100 for pivotally mounting the blade member and the lever, so that the carrier member 12 can be easily provided with the latch releasing mechanism of the present invention.

As is apparent from the foregoing description, the latch releasing mechanism of the present invention can be made in a comparatively small size, since the various components, such as the blade member, lever and lock member are provided one over the other. Furthermore, since the blade member and the lever are mounted on the carrier member by only one shaft, not only is the manufacturing facilitated, but also the manufacturing cost is reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. In a shiftable seat for use in a vehicle mounted on a carrier member which slidably moves back and forth between forward and retracted positions along a rail member fixedly provided on a body of the vehicle, said seat being biased towards the forward position, and having a seat cushion and a reclining back cushion pivotally connected to the seat cushion for tilting the back cushion towards the seat cushion, said seat being coupled with a latch means for maintaining said seat in a required position between said forward and retracted positions, a latch releasing mechanism for releasing said latch means, upon tilting the back cushion towards the seat cushion, for shifting said seat towards said forward position, said latch releasing mechanism comprising:

a latch release blade pivotally mounted on the carrier member for movement towards and away from a predetermined position at which the latch release blade releases the latch mechanism, said latch release blade being moved to said predetermined position upon movement of the back cushion when the back cushion is tilted, and said latch release blade having a detent recess;

a manually operable lever pivotally mounted on the carrier member, said manually operable lever having a trigger arm engageable with said latch release blade for movement of said latch release blade towards said predetermined position upon movement of said manually operable lever towards a predetermined position;

a lock member pivotally mounted on said manually operable lever, said lock member having an engaging portion which is engageable with said detent recess when said latch release blade is moved to the predetermined position;

means for biasing said lock member in a predetermined direction to lock the latch release blade in the predetermined position when the latch release blade is moved to the predetermined position; and detent release means provided on said rail for moving the lock member in an opposite direction to the predetermined biased direction to unlock the latch release blade when the lock member is moved by the detent release means as a result of movement of said carrier member towards the retracted position.

2. A latch releasing mechanism as claimed in claim 1 further comprising a support plate fixedly provided on said carrier member for mounting thereon said latch release balde and manually operable lever provided with said lock member.

3. A latch releasing mechanism as claimed in claim 1 further comprising a first spring means provided between said latch release blade and said carrier member for urging said latch release blade to rotate away from said predetermined position.

4. A latch releasing mechanism as claimed in claim 1 further comprising a second spring means provided between said manually operable lever and carrier member for urging said manually operable lever to rotate in a direction opposite to said predetermined direction.

5. A latch releasing mechanism as claimed in claim 1, wherein said latch release blade and said lever are pivotally mounted on the carrier member on a same signal shaft.

6. A latch releasing mechanism as claimed in claim 1, wherein said detent release means is a projection fixedly provided on said rail, said lock member being engaged with said projection when moved past the projection for rotating the lock member.

7. A latch releasing mechanism as claimed in claim 1, wherein said detent release means is a bar member of substantially "L" shaped cross section fixedly provided on said rail, said bar member having one end terminating at one end portion of the rail corresponding with said retracted position of the seat and the other end terminating at the intermediate portion of the rail corresponding with said forward position of the seat, said lock member being engaged with said other end of said bar member when moved past said other end of the bar member for rotating the lock member.

* * * * *